United States Patent [19]
van Dort et al.

[11] Patent Number: 5,178,058
[45] Date of Patent: Jan. 12, 1993

[54] FILTERPAN RING FOR BREWING PREPACKAGED DRY BEVERAGES

[75] Inventors: Gerardus J. van Dort, Utrecht; Cornelis van Hal, Odijk; Emil H. Rusche, Nieuwegein; Christoffel A. J. Vroonland, Soesterberg, all of Netherlands

[73] Assignee: Sara Lee/DE N.V., Utrecht, Netherlands

[21] Appl. No.: 836,552

[22] Filed: Feb. 18, 1992

Related U.S. Application Data

[63] Continuation of Ser. No. 552,057, July 13, 1990, abandoned.

[30] Foreign Application Priority Data

Jul. 13, 1989 [NL] Netherlands .......................... 8901809

[51] Int. Cl.⁵ .......................... A47J 31/10; A47J 31/44
[52] U.S. Cl. .......................... 99/295; 99/299; 99/300
[58] Field of Search .................. 99/295, 296, 298, 299, 99/279, 300, 301, 304-307, 313, 315-317, 323; 426/433

[56] References Cited

U.S. PATENT DOCUMENTS

| | | | |
|---|---|---|---|
| 2,684,624 | 7/1954 | Alvarez et al. | 99/306 X |
| 3,347,151 | 10/1967 | Ronalds | 99/295 |
| 3,384,004 | 5/1968 | Perlman et al. | |
| 3,450,024 | 6/1969 | Martin. | |
| 3,511,166 | 5/1970 | Bixby, Jr. | 99/302 R |
| 3,610,132 | 10/1971 | Martin. | |
| 3,620,155 | 11/1971 | Bixby, Jr. | 99/295 |
| 3,823,656 | 7/1974 | Vander Veken | 99/295 |
| 3,853,043 | 12/1974 | Stavropoulos | 99/299 X |
| 3,858,493 | 1/1975 | Hermsen | 99/306 |
| 3,931,756 | 1/1976 | Van Brunt | 99/306 |
| 4,211,157 | 7/1980 | Sakai et al. | 99/306 |
| 4,666,724 | 5/1987 | DiLorenzo. | |
| 4,735,719 | 4/1988 | Benedict | 99/295 X |

FOREIGN PATENT DOCUMENTS

| | | | |
|---|---|---|---|
| 114717 | 8/1984 | European Pat. Off. | 99/323 |
| 0115557 | 8/1984 | Fed. Rep. of Germany. | |
| 3411612 | 10/1984 | Fed. Rep. of Germany | 99/300 |
| 3613119 | 4/1986 | Fed. Rep. of Germany. | |
| 7703422 | 10/1978 | Netherlands | 99/300 |
| 8403438 | 6/1986 | Netherlands. | |

Primary Examiner—Harvey C. Hornsby
Assistant Examiner—Charles Cooley
Attorney, Agent, or Firm—Longacre & White

[57] ABSTRACT

An apparatus for preparing a number of consumption units of a beverage, such as coffee or tea, comprising a beverage making apparatus with a hot water outflow passage, a filterpan and a disposable filter cartridge which fits into the filterpan, the filterpan and filter cartridge are adapted to form a watertight seal, and a support surface being provided for a vessel for receiving the extract. The apparatus has a filterpan ring which prevents the hot water form reaching an internal bottom peripheral surface of the filterpan before the heated water contacts a central portion of an upper surface of the cartridge.

8 Claims, 2 Drawing Sheets

FILTERPAN RING FOR BREWING PREPACKAGED DRY BEVERAGES

This is a file wrapper continuation of application Ser. No. 07/552,057, filed Jul. 13, 1990, which was abandoned upon the filing hereof.

BACKGROUND AND SUMMARY OF THE INVENTION

The invention relates to an apparatus for preparing a number of consumption units of a beverage, such as coffee or tea, comprising a beverage making apparatus with water supply means, a filterpan and a disposable filter cartridge that fits into the filterpan, the filterpan and filter cartridge having cooperating parts for forming a watertight seal, and a support surface being provided for a vessel for receiving the extract.

In such an apparatus, essentially all of the water must be passed through the central portion of the filter if all of the water is to properly participate in the brewing process. If, instead, some of the water flows away at the sides via the route of least resistance, all of the water will not or will not participate sufficiently in the brewing process.

An apparatus which addresses this problem is disclosed in German Auslegeschrift 3.613.119 and the corresponding European patent application 249,700. To ensure that all of the water passes through the filter at the proper location, this apparatus makes use of the effect of the degassing of the coffee. This creates a minor excess pressure in the space within the filter cartridge. As a result, the upper surface of the filter will bulge in such a way that this surface engages the downwardly directed, suspending circular edge of a partition along the inner side of which the heated water is supplied.

This requires very accurate dimensioning to ensure that sufficient bulging occurs. Accordingly, only specially shaped filters, in which the material to be extracted is uniformly distributed can be used. Nevertheless, before the bulging takes place, a part of the water will freely flow away at the sides and thus participates insufficiently in the brewing process.

The present invention is directed to this problem. To solve this problem, the apparatus of the present invention has a filterpan ring, i.e., the water outflow part, which ensures that all of the water reaches the filter.

The filterpan ring may be connected to the filterpan for pivoting movement.

In one embodiment of the invention, the water supply rate may be higher than the discharge rate of the extract. It will be clear that, in that case, the volume of the part of the filterpan that is external relatively to the outflow part must be sufficiently large to receive the excess water.

By providing an opening at the top of the water outflow part, the build-up of too large a pressure in the water outflow part, and hence the chance of accidents happening, is avoided.

THE PRIOR ART

In addition to the prior art discussed above, U.S. Pat. No. 3,561,349, discloses a coffee making apparatus utilizing a spray nozzle to be fixedly mounted on the filter cartridge, to ensure that the hot water supplied can participate in the extraction at the central part of the filter cartridge. It will be clear this apparatus requires very precise handling.

The same holds for the disclosure in U.S. Pat. No. 3,511,166, which, moreover, involves the risk of the user coming into contact with hot water when he is in a hurry to make a cup of coffee and is impatient. Furthermore, the apparatus is considerably more complex than the apparatus of the present invention. Also, at the outset of the brewing cycle, water will readily flow away via the route of least resistance, i.e., without having participated in the extraction. This problem also occurs in the apparatus disclosed in U.S. Pat. No. 3,561,349.

European patent application 70,403 discloses an apparatus for making espresso.

U.S. Pat. No. 3,450,024 is similar to the U.S. Pat. No. 3,561,349, discussed hereinabove.

The water outflow part in the present invention is part of the filterpan, which is not the case in German patent application 3.613.119.

The apparatus according to the present invention has the further advantage than when the water is poured, the filter cartridge cannot start floating since it is effectively "wedged" between the cylindrical guide and the filter pan. A further advantage of the apparatus according to the present invention is the more defined brewing behavior compared with the known methods of brewing coffee since all of the water participates in the extraction.

Further, the diameter of the filterpan ring in the apparatus according to the present invention is preferably larger than 0.6 times the diameter of the filter cartridge. Thus, it is ensured that for obtaining a particular amount of extract, the water column above the filter cartridge will not be too high; and that, accordingly, the pressure will not be too high, which will prevent the water from percolating too fast.

DETAILED DESCRIPTION OF THE DRAWINGS

Figure 1:
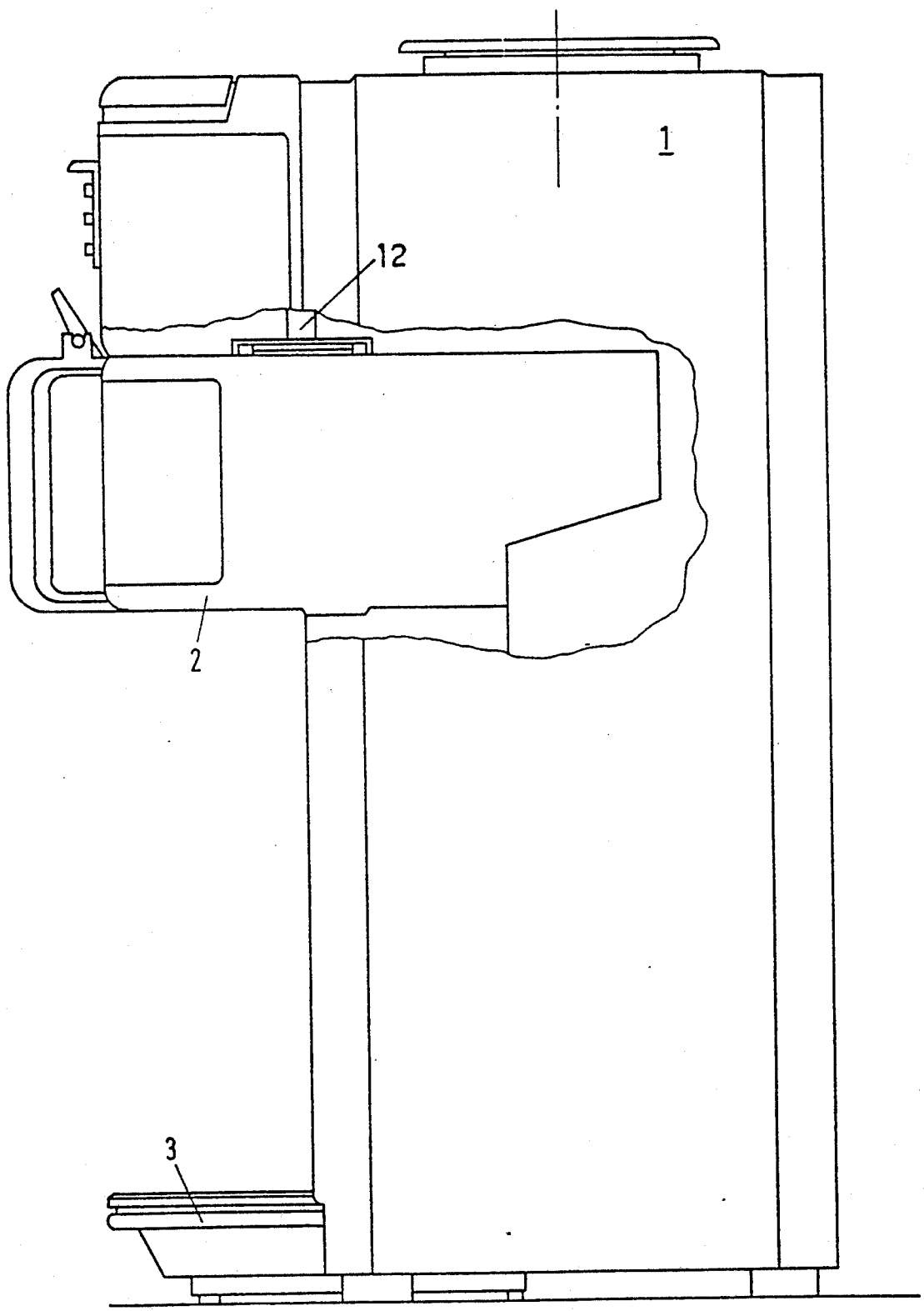
FIG. 1 is a schematic, partly sectional, side view of the coffee making apparatus according to the present invention.

FIG. 1 shows a coffee making apparatus 1 which comprises in the conventional manner known elements (not shown in detail, therefore) including a housing 1, a filterpan 2 and a support 3 for supporting a holder (not shown) for receiving the beverage prepared. In a similarly known conventional manner, water heated within the apparatus 1 flows out through an outflow passage 12 in the filterpan 2.

Figure 2:
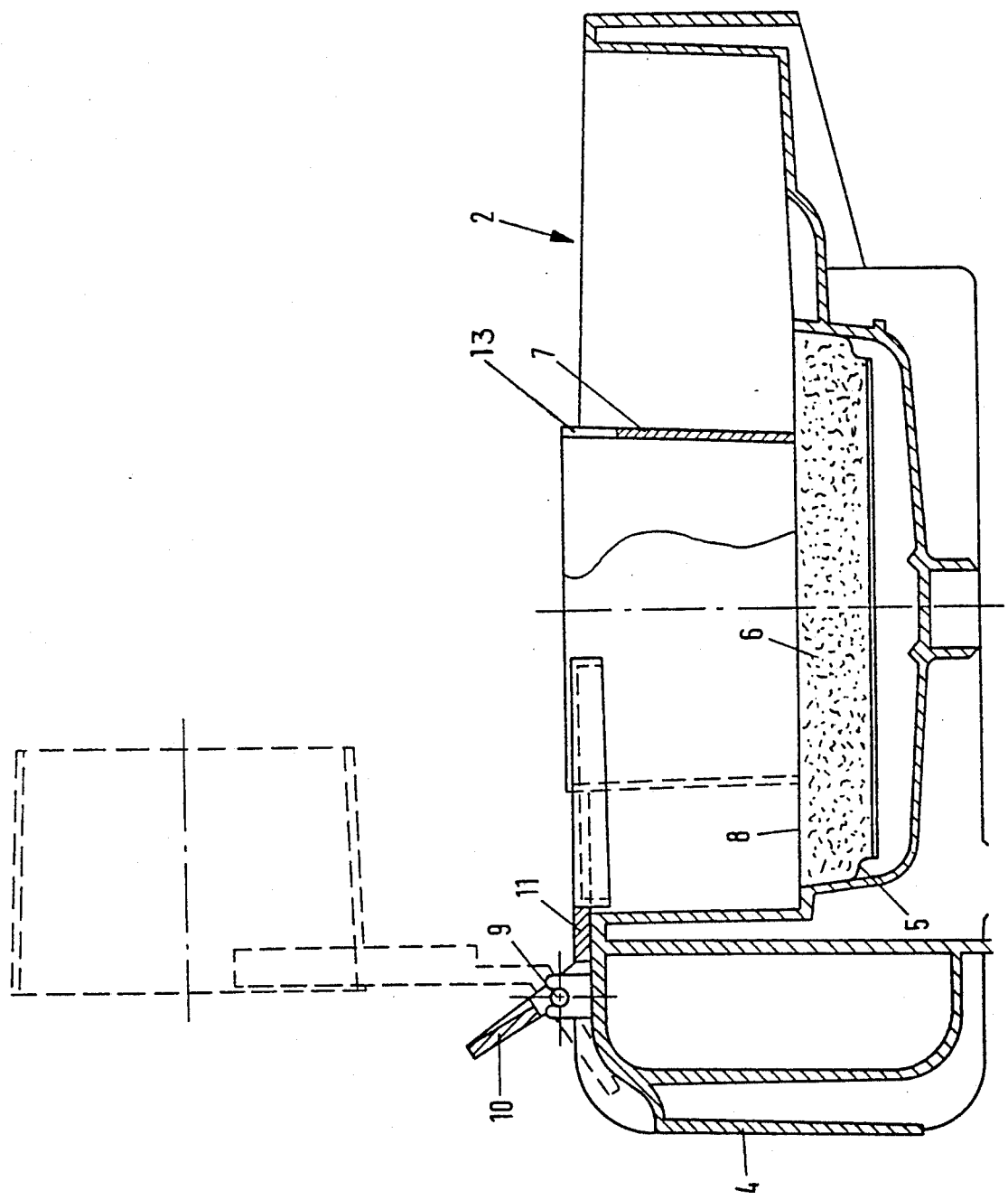
FIG. 2 is a sectional view of the filterpan used in the apparatus according to FIG. 1, with the ring in mounted position.

The filterpan 2 is shown at an enlarged scale in FIG. 2 and comprises a grip 4 in the known manner.

The filterpan 2 is constructed in the known manner so that it can accommodate a filter cartridge, to be used once and filled with ground coffee or a different material, in such a way that water that is poured on the filter cartridge cannot freely percolate between the wall of the filter cartridge 5 and the filterpan, but is forced to pass through the filter cartridge and the coffee 6 or other material present in the filter cartridge 5. To promote this, and to ensure that no liquid percolates at the edges of the filter cartridge and thus participates insufficiently in the extraction of the ground product, for instance coffee, in the filter cartridge 5, the filterpan has a hot water outflow part, i.e., the filterpan ring 7 pivotally mounted to it, via which part the hot water is supplied to the filterpan. Because the filterpan ring is moved down as far as an upper filter 8 of the filter cartridge 5, this ensures that the water is supplied and percolates at the central portion of the filter cartridge 5. As a result, all of the water participates in the extraction of the ground product, i.e., the coffee 6. The construction is such that this process will take place independently of the degassing of the ground product.

FIG. 2 further shows that the filterpan ring 7 is rotatably connected with the filterpan 2 by means of an arm 11 and a pin 9 and a finger key 10.

After the coffee has been made, the filter cartridge 5 can be removed by displacing the filterpan ring part 7 into the position indicated in FIG. 2 by the broken lines, after which the filter cartridge 5 can be readily removed and the whole can be cleaned.

The apparatus according to the present invention is to be used for preparing a plurality of consumption units of an extracted beverage using disposable prepackaged dry unextracted cartridges of the beverage. The apparatus comprises known means for supplying hot water including means for receiving water, means for heating the water and outlet means for discharging the heated water. Since these elements are well known in the art, they are not shown in the Figures. The apparatus further comprises a filterpan 2 for extracting the beverage which is located to receive the heated water. The filterpan 2 has an internal periphery surface which is adapted to receive the disposable beverage cartridge 6. The internal periphery surface has means (not shown) for forming a watertight seal with the inserted cartridge. The filterpan 2 has means for preventing the heated water from reaching the internal periphery surface of the filterpan. In a preferred embodiment, the means comprise a filterpan ring 7 which is a cylindrical ring with a predetermined height. The filterpan ring can be displaced in order to insert the unextracted beverage cartridge and then later remove the used beverage cartridge.

The filterpan ring functions to restrain the heated water in the central portion of the upper surface of the cartridge thereby ensuring that all of the water percolates efficiently through the beverage cartridge. A notch 13 at the upper end of the filterpan ring 7 ensures the restrained heated water foes not exceed a predetermined height within the filterpan ring 7.

It will be clear that without departure from the invention, a great number of modifications are conceivable. Thus, instead of constructing the filterpan ring with a rotatable suspension, it may be of such construction that it can be rotated sideways relatively to the filter cartridge. In a similar way, numerous variants are conceivable. Thus, the apparatus according to the invention can also be used for cold extraction. In this connection, reference is made to applicant's Dutch patent application 87,01569 and the corresponding U.S. patent application Ser. No. 214,528, filed on Jul. 1, 1988.

What we claim is:

1. An apparatus for preparing a plurality of consumption units of an extracted beverage from disposable prepackaged dry unextracted cartridges of said beverage using heated water, said cartridge being substantially circular and having a predetermined diameter and height, comprising:
    (a) a filterpan for extracting said beverage and adapted to receive said heated water, said filterpan having an internal bottom periphery surface adapted to receive said disposable prepackaged cartridge of said beverage,
    (b) said internal bottom periphery surface adapted to form a watertight seal with said cartridge,
    (c) said filterpan having an outlet for draining said extracted beverage, and
    (d) means for preventing said heated water from reaching said internal bottom periphery surface of said filterpan before said heated water contacts a central portion of an upper surface of said cartridge, wherein said means for preventing said heated water from reaching said internal periphery surface of the filterpan comprises a filterpan ring pivotally mounted to said filterpan and adapted to be positioned contiguous with said cartridge, said filterpan ring being a substantially cylindrical ring with a predetermined height and having a uniform predetermined diameter less than the diameter of said cartridge.

2. An apparatus according to claim 1, wherein the diameter of said filterpan ring is at least 0.6 times the diameter of said cartridge.

3. An apparatus for preparing a plurality of consumption units of an extracted beverage from disposable prepackaged dry unextracted cartridges of said beverage using heated water, said cartridge being substantially circular and having a predetermined diameter and height, comprising:
    (a) a filterpan for extracting said beverage and adapted to receive said heated water, said filterpan having an internal bottom periphery surface adapted to receive said disposable prepackaged cartridge of said beverage,
    (b) said internal bottom periphery surface adapted to form a watertight seal with said cartridge,
    (c) said filterpan having an outlet for draining said extracted beverage, and
    (d) means for preventing said heated water from reaching said internal bottom periphery surface of said filterpan before said heated water contacts a central portion of an upper surface of said cartridge, wherein said means for preventing said heated water from reaching said internal periphery surface of the filterpan comprises a filterpan ring pivotally mounted to said filterpan and adapted to be positioned contiguous with said cartridge, said filterpan ring being a substantially cylindrical ring with a predetermined height and having a uniform predetermined diameter less than the diameter of said cartridge;
    wherein said heated water collects in said filterpan ring, and an excess of said heated water is adapted to flow out of the filterpan ring into the filterpan.

4. An apparatus according to claim 3, wherein the volume of the filterpan outside of the filterpan ring is adapted to receive the excess water.

5. An apparatus for preparing a plurality of consumption units of an extracted beverage from disposable prepackaged dry unextracted cartridges of said beverage using heated water, said cartridge being substantially circular and having a predetermined diameter and height, comprising:
    (a) a filterpan for extracting said beverage adapted to receive said water, said filterpan having an internal bottom periphery surface adapted to receive said disposable prepackaged cartridge of said beverage, (b) said internal bottom periphery surface adapted to form a watertight seal with said cartridge, (c) said filterpan having an outlet for draining said extracted beverage, and (d) a support surface for a vessel to receive said extracted beverage from said outlet of said filterpan, and (e) a filterpan ring pivotally mounted to said filterpan and adapted to be positioned contiguous with said cartridge, said filterpan ring is a substantially cylindrical ring with a predetermined height, and having a predetermined diameter less than the diameter of said cartridge for preventing said heated water from reaching said internal ring bottom periphery surface of said filterpan before said heated water contacts a central portion of an upper surface of said cartridge.

6. An apparatus for preparing a plurality of consumption units of an extracted beverage from disposable prepackaged dry unextracted cartridges of said beverage using heated water, said cartridge having a predetermined horizontal area and height, comprising:

(a) a filterpan for extracting said beverage adapted to receive said heated water, said filterpan having an internal bottom periphery surface adapted to receive said disposable prepackaged cartridge of said beverage, (b) said internal bottom periphery surface adapted to form a watertight seal with said cartridge, (c) said filterpan having an outlet for draining said extracted beverage, and (d) a support surface for a vessel to receive said extracted beverage from said outlet of said filterpan, and (e) a filterpan ring pivotally mounted to said filterpan and adapted to be positioned contiguous with said cartridge, said filterpan ring having a predetermined height and enclosing a predetermined horizontal area less than said horizontal area of said cartridge for preventing said heated water from reaching said internal bottom periphery surface before said heated water contacts a central portion of an upper surface of said cartridge.

7. An apparatus for preparing a plurality of consumption units of a hot beverage, such as coffee, by extraction of a base material, such as ground coffee, packed in disposable cartridges, said cartridges having a flat bowl-like configuration, at least an upper side thereof being defined by a flat wall of filter material, said apparatus comprising:

an outflow passage for water heated within the apparatus;

a filterpan for receiving hot water from said outflow passage and positionable in said apparatus under said outflow passage, said filterpan having an upper top side and a bottom, a bowl-like depression being formed in said bottom centered under said outflow passage, said bowl-like depression being designed to fit and laterally seal said cartridge;

a hot water guide tube in the from of a cylinder having a diameter smaller than the diameter of said upper side of said cartridges, said guide tube is pivotally mounted to said filterpan and includes means for displacing said guide tube between a first position wherein the tube extends vertically within said filterpan so that its upper end is proximate to said outflow passage while its lower end rests on said upper side of said cartridge placed in said depression in the filterpan bottom, and a second position wherein said guide tube is entirely outside the filter pan.

8. An apparatus as claimed in claim 7, wherein an upper portion of said guide tube comprises a notch defining an overflow for hot water supplied to said guide tube, said notch allowing water to flow towards the interior space of said filterpan outside said guide tube.

* * * * *